(12) United States Patent
Lim et al.

(10) Patent No.: US 9,173,110 B2
(45) Date of Patent: Oct. 27, 2015

(54) METHOD AND APPARATUS FOR MEASURING A CHANNEL STATUS BETWEEN TERMINALS IN A WIRELESS ACCESS SYSTEM THAT SUPPORTS COOPERATIVE COMMUNICATION

(75) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 13/881,649

(22) PCT Filed: Oct. 27, 2011

(86) PCT No.: PCT/KR2011/008099
§ 371 (c)(1),
(2), (4) Date: Apr. 25, 2013

(87) PCT Pub. No.: WO2012/057547
PCT Pub. Date: May 3, 2012

(65) Prior Publication Data
US 2013/0235754 A1 Sep. 12, 2013

Related U.S. Application Data

(60) Provisional application No. 61/407,456, filed on Oct. 28, 2010.

(30) Foreign Application Priority Data

Oct. 27, 2011 (KR) ........................ 10-2011-0110434

(51) Int. Cl.
*H04W 24/00* (2009.01)
*H04W 72/04* (2009.01)
(Continued)

(52) U.S. Cl.
CPC ............. *H04W 24/00* (2013.01); *H04L 5/0035* (2013.01); *H04L 5/0048* (2013.01);
(Continued)

(58) Field of Classification Search
None
See application file for complete search history.

(56) References Cited

U.S. PATENT DOCUMENTS 8,504,052 B2 * 8/2013 Hakola et al. ............... 455/452.1
2007/0202882 A1 * 8/2007 Ju et al. ........................ 455/450
(Continued)

FOREIGN PATENT DOCUMENTS

| KR | 10-2008-0086895 | 9/2008 |
| KR | 10-2009-0082851 | 7/2009 |
| KR | 10-2010-0092618 | 8/2010 |

OTHER PUBLICATIONS

Kim, et al., "Contribution for Hierarchical Network Study Report," IEEE 802.16 Broadband Wireless Access Working Group, IEEE C802.16ppc-10/0044, Jul. 2010, 9 pages.
(Continued)

*Primary Examiner* — Vincelas Louis
(74) *Attorney, Agent, or Firm* — Lee, Hong, Degerman, Kang & Waimey

(57) ABSTRACT

A method and device for measuring a channel status between a first user equipment (UE) and a second UE. The method performed by the second UE includes: receiving control information related to a dedicated sounding zone from a base station through at least one of the plurality of downlink subframes, where the dedicated sounding zone is radio resource allocated for receiving a sounding signal; and receiving the sounding signal from the first UE, where the sounding signal is included in an initial symbol of an initial subframe of the plurality of uplink subframes, and where the initial symbol is included in the dedicated sounding zone. The method also includes measuring the channel status between the first UE and the second UE by using the sounding signal; and reporting a result of measurement for the channel status to the base station.

4 Claims, 13 Drawing Sheets

(51) Int. Cl.
*H04L 5/00* (2006.01)
*H04L 27/26* (2006.01)
*H04W 52/38* (2009.01)
*H04B 7/02* (2006.01)
*H04W 24/10* (2009.01)
*H04W 76/02* (2009.01)

(52) U.S. Cl.
CPC ............ *H04W 72/042* (2013.01); *H04B 7/024* (2013.01); *H04L 27/2611* (2013.01); *H04W 24/10* (2013.01); *H04W 52/383* (2013.01); *H04W 76/023* (2013.01)

(56) References Cited

U.S. PATENT DOCUMENTS

| | | | |
|---|---|---|---|
| 2009/0011778 A1* | 1/2009 | Jung et al. | 455/456.3 |
| 2009/0257423 A1 | 10/2009 | Kwon et al. | |
| 2010/0165882 A1* | 7/2010 | Palanki et al. | 370/254 |
| 2010/0165954 A1* | 7/2010 | Lin et al. | 370/335 |
| 2010/0322328 A1* | 12/2010 | Schirmacher et al. | 375/260 |

OTHER PUBLICATIONS

Korean Intellectual Property Office Application Serial No. 10-2011-0110434, Office Action dated Apr. 23, 2013, 4 pages.

* cited by examiner

FIG. 3
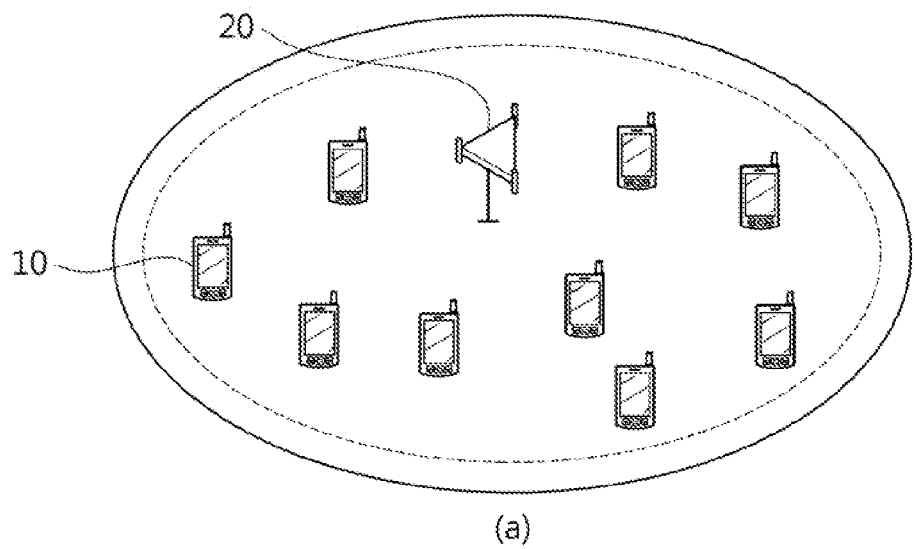
(a)
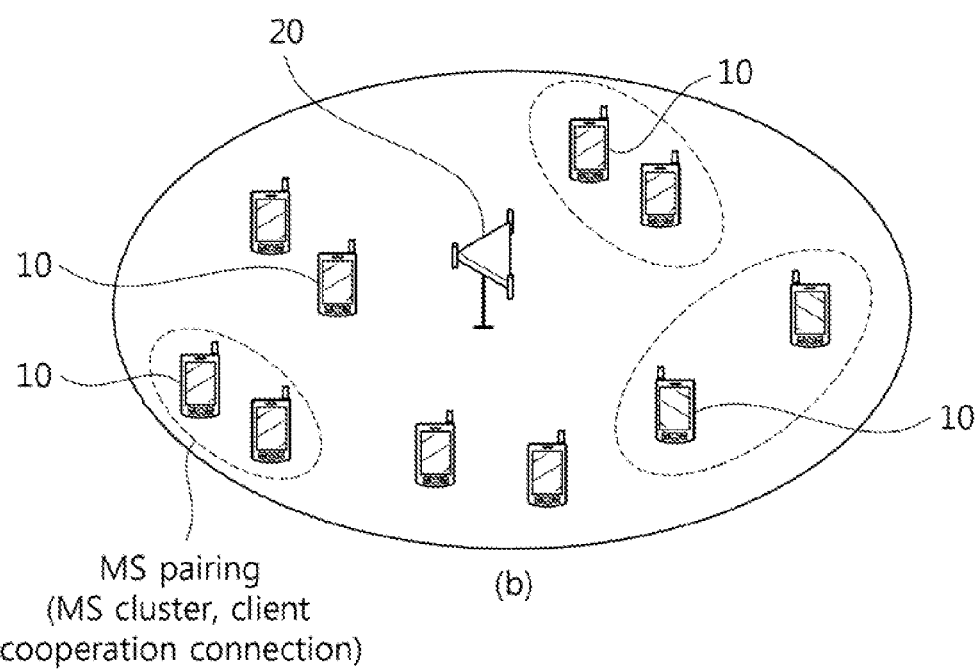
MS pairing
(MS cluster, client
cooperation connection)
(b)

——— First network transmission
(e.g., WiMAX uplink transmission)

- - - Second network transmission
(e.g., WiFi transmission)

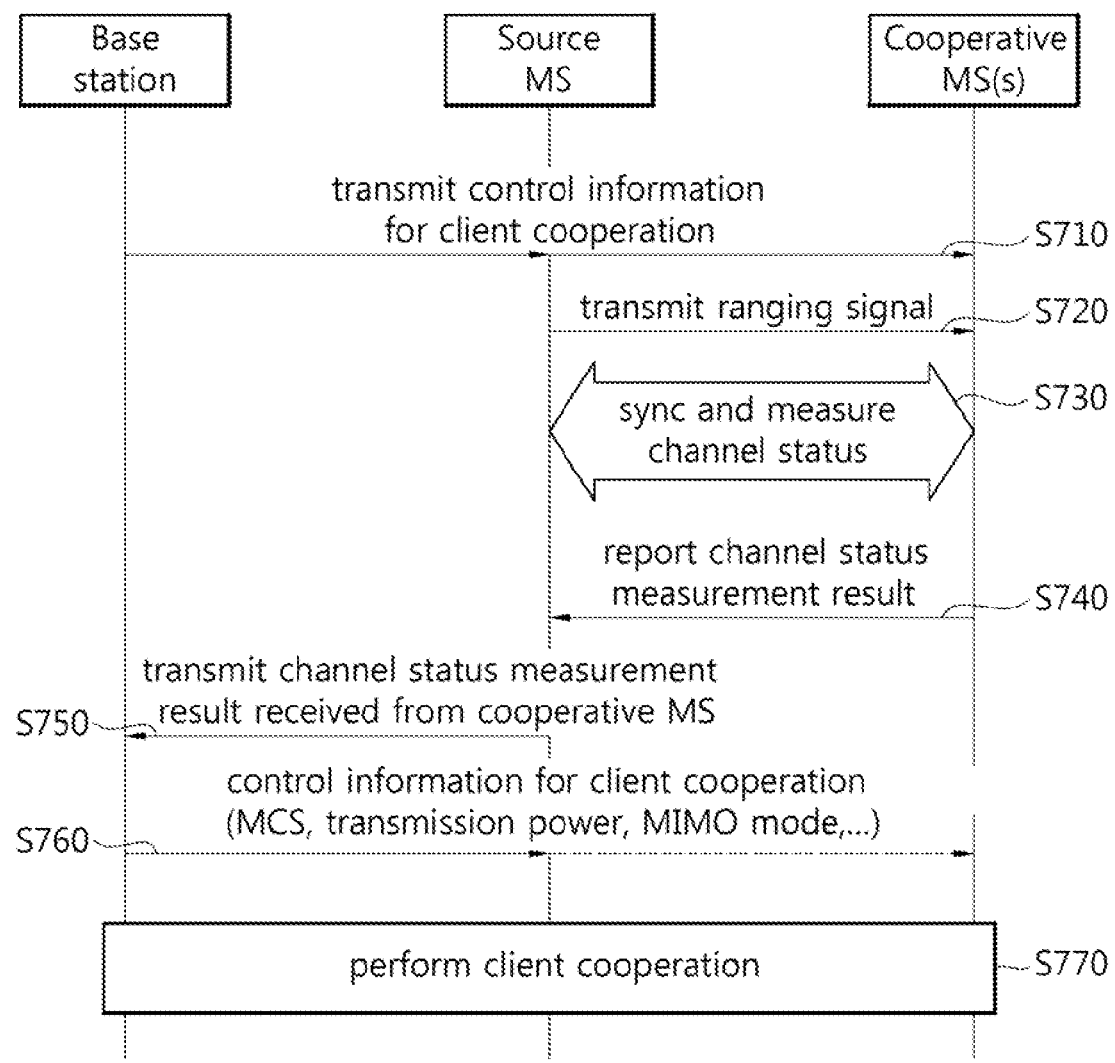

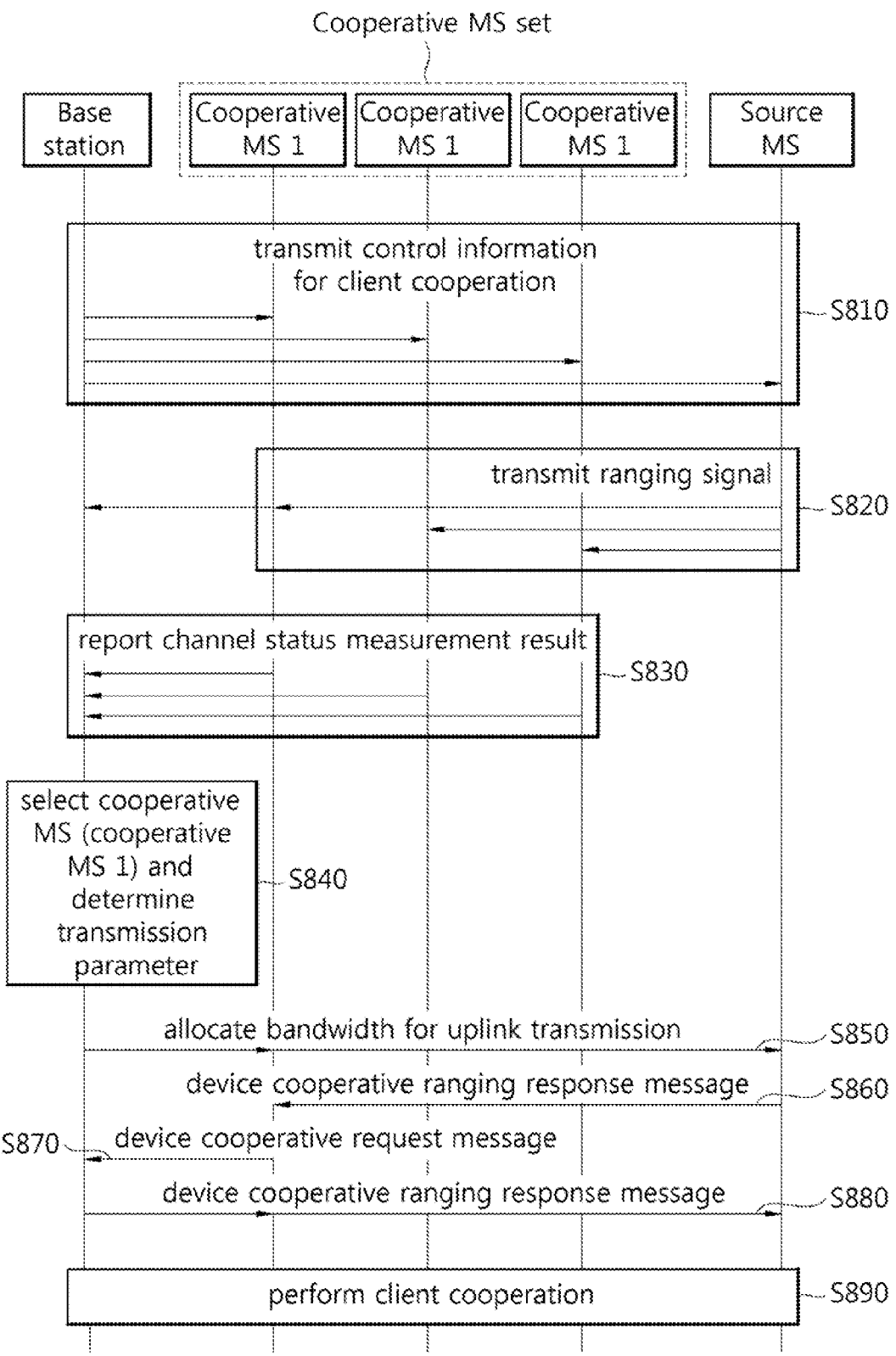

METHOD AND APPARATUS FOR MEASURING A CHANNEL STATUS BETWEEN TERMINALS IN A WIRELESS ACCESS SYSTEM THAT SUPPORTS COOPERATIVE COMMUNICATION

CROSS-REFERENCE TO RELATED APPLICATIONS

This application is the National Stage filing under 35 U.S.C. 371 of International Application No. PCT/KR2011/008099, filed on Oct. 27, 2011, which claims the benefit of earlier filing date and right of priority to Korean Patent Application No. 10-2011-0110434, filed on Oct. 27, 2011, and also claims the benefit of U.S. Provisional Application Ser. No. 61/407,456, filed on Oct. 28, 2010, the contents of which are all hereby incorporated by reference herein in their entirety.

BACKGROUND OF THE INVENTION

1. Field of the Invention

The present invention relates to a wireless access system supporting a cooperative communication, and particularly, to a method and apparatus for measuring a channel status between mobile stations.

2. Related Art

Standardization for a cooperative-MIMO (CO-MIMO) and a signal transmission through a relay or femto cell in an IEEE 802.16m system or LTE (-A) system is in progress to enhance transmission efficiency and throughput of mobile stations (MSs) with poor channel status among MSs positioned in a cell.

Further, besides methods of supporting MSs using a base station or a femto cell or relay that operates as a base station as described above, research for cooperative communication (e.g., mobile relaying) that transmits signals through cooperation between MSs or a client cooperation (CC) is recently underway for the 802.16 systems or LTE (-A) systems.

Current cellular wireless transmission systems define transmission/reception methods between a base station and an MS. In such case, the base station may transmit signals to the MS using a femto BS or relay station (RS) so as to effectively transmit signals to the MS.

In the foregoing, the femto-BS or RS plays a role as a base station. In the current IEEE 802.16 and 3GPP LTE/LTE-A standards, signal transmission over links between BS (or femto-BS)-MS, BS-RS, and MS-RS are being actively standardized.

However, more research is being conducted not only on device-to-device communication between the human type device (HTC), but also on device-to-device communication between machine type devices (MTCs) with increasing demand for lower power consumption, transmission reliability, or enhanced throughput.

SUMMARY OF THE INVENTION

The present invention provides a method of measuring a transmission link (or a channel status) between mobile stations (MSs) for the MSs to be able to perform cooperative communication (cooperation or relaying) in case D2D (device to device) communication is conducted.

Further, the present invention provides a signaling process for initiating or maintaining cooperative communication between MSs considering the channel status measured between the MSs.

Further, the present invention provides a method for allowing MSs to perform cooperative communication when the MSs are in an idle mode.

In an aspect, a method for measuring a channel status between a source MS and a cooperative MS in a wireless access system supporting a cooperative communication between MSs is provided. The method includes receiving, by the source MS, first control information for performing the cooperative communication from a base station, the first control information including resource allocation information and control signal information allocated for measuring the channel status between the source MS and the cooperative MS, measuring, by the source MS, the channel status between the source MS and the cooperative MS using the resource allocation information and the control signal information, receiving, by the source MS, second control information for performing the cooperative communication between the source MS and the cooperative MS from the base station, and performing, by the source MS, the cooperative communication using the second control information.

The measuring the channel status may include transmitting, by the source MS, the control signal information to the cooperative MS using a resource allocated by the base station, and obtaining a sync with the cooperative MS and measuring the channel status based on the control signal information by the source MS.

The method may further include transmitting a request for the cooperative communication. The request for the cooperative communication may be initiated by the source MS or the base station.

A cooperative communication type indicator indicating a mobile relaying or a cooperative communication may be transmitted and received through the request for the cooperative communication.

The control signal information may be a ranging sequence or a sounding signal.

If the control signal information is a periodic ranging sequence, a part of a resource where an initial ranging sequence may be allocated.

The first control information may include at least one of an MS identifier (STID), a pilot pattern, reference sequence information, a time offset, and a transmit power.

The second control information may include at least one of a start time, a duration, and a transmit parameter of the cooperative communication.

In another aspect, a method for measuring a channel status between a source mobile station (MS) and a cooperative MS in a wireless access system supporting a cooperative communication between MSs is provided. The method includes receiving, by the cooperative MS, control information for measuring the channel status between the source MS and the cooperative MS from a base station, the control information including resource allocation information allocated for measuring the channel status between the source MS and the cooperative MS and information on a sounding signal, receiving, by the cooperative MS, the sounding signal from the source MS, obtaining a sync with the source MS and measuring the channel status using the received sounding signal, and reporting a result of the channel status measurement with the source MS to the base station.

The sounding signal may be received through an uplink transmission region.

The uplink transmission region may include a transition gap where mode switching may be made to a transmission mode or a reception mode.

The receiving the sounding signal may include performing mode switching from the transmission mode to the reception mode in the transition gap. The sounding signal transmitted from the source MS may be received in the mode-switched reception mode.

The reporting the result of the channel status measurement to the base station may include performing mode switching from the reception mode to the transmission mode in the transition gap. The result of the channel status measurement with the source MS may be reported to the base station in the mode-switched transmission mode.

The sounding signal may be transmitted through a first or last symbol of a subframe where the sounding signal is transmitted.

The transition gap may be positioned at a last symbol of a last subframe in a reception mode region of the cooperative MS.

If the transition gap is positioned in a subframe where the sounding signal is transmitted, the transition gap may be placed at a symbol right after a symbol where the sounding signal is transmitted, or the sounding signal may be transmitted at a first symbol of the subframe and the transition gap may be positioned at a last symbol of the subframe.

In another aspect, a method for measuring a channel status between a source mobile station (MS) and a cooperative MS in a wireless access system supporting a cooperative communication between MSs is provided. The method includes receiving, by the cooperative MS, information on an uplink transmission of the source MS from a base station, performing, by the cooperative MS, mode switching from a transmission mode to a reception mode to hear the uplink transmission transmitted from the source MS to the base station in an uplink transmission region, hearing, by the cooperative MS, an uplink signal transmitted from the source MS in the reception mode, measuring, by the cooperative MS, the channel status between the source MS and the cooperative MS using the heard uplink signal of the source MS, and reporting, by the cooperative MS, the measured channel status to the base station.

The information on the uplink transmission of the source MS may be at least one of a transmission offset, a transmission/reception switching indicator, an uplink resource allocation, an MS identifier (STID), an MIMO mode, an uplink sounding signal, a pilot signal, MCS information, and transmission power information.

The mode switching may be performed only on a subframe where a sounding signal transmitted from the source MS to the cooperative MS is transmitted.

In another aspect, a source mobile station (MS) for measuring a channel status between the source MS and a cooperative MS in a wireless access system supporting a cooperative communication between MSs is provided. The source MS includes a wireless communication unit for transmitting and receiving a wireless signal from an outside, and a controller connected to the wireless communication unit. The controller controls the wireless communication unit to receive first control information for performing the cooperative communication between MSs from a base station, wherein the first control information includes resource allocation information and control signal information allocated for measuring the channel status between the source MS and the cooperative MS, controls to measure the channel status between the source MS and the cooperative MS using the resource allocation information and the control signal information, controls the wireless communication unit to receive second control information for performing the cooperative communication between the source MS and the cooperative MS, and controls to perform the cooperative communication between MSs using the second control information.

The first control information may include at least one of an MS identifier (STID), a pilot pattern, reference sequence information, a time offset, and a transmit power.

The second control information may include at least one of a start time, a duration, and a transmit parameter of the cooperative communication.

According to the present invention, a method of measuring a channel status between MSs performing a cooperative communication is newly defined so that a source MS may conduct the cooperative communication with a cooperative MS with the best channel status.

Further, according to the present invention, a method of transmitting a control signal (a ranging sequence or sounding signal) for channel measurement is provided so that a resource used for measuring a channel status between MSs may be efficiently used.

Further, according to the present invention, an MS that stays in an idle mode may participate in a cooperative communication, so that an MS' power consumption may be reduced and the lifetime of the MS may be prolonged.

BRIEF DESCRIPTION OF THE DRAWINGS

FIG. 3 shows a concept of a cooperative cluster of mobile stations according to an embodiment of the present invention.

FIG. 7 is a flowchart showing a method of measuring a channel status between a source MS and a cooperative MS using a ranging sequence according to another embodiment of the present invention.

FIG. 8 is a flowchart showing a method of measuring a channel status between a source MS and a cooperative MS using a ranging sequence according to another embodiment of the present invention.

DESCRIPTION OF EXEMPLARY EMBODIMENTS

Figure 1:
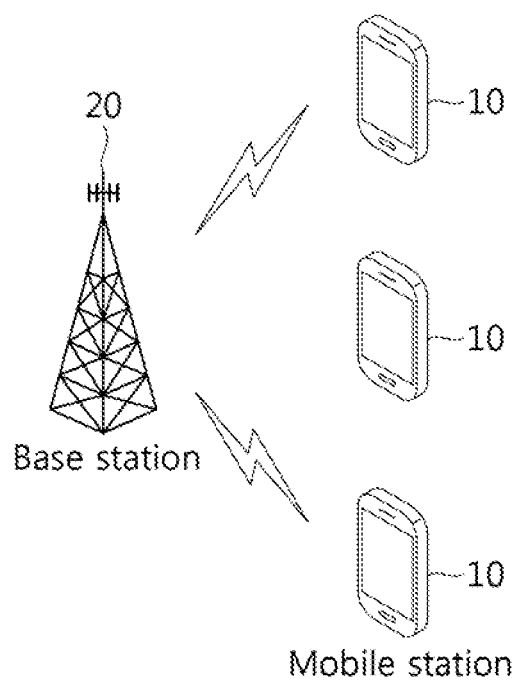
FIG. 1 is a concept diagram showing a wireless communication system according to an embodiment of present invention.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

FIG. 1 is a concept diagram showing a wireless communication system according to an embodiment of present invention. Wireless communication systems may be widely arranged to provide various communication services such as voice, packets, or data.

Referring to FIG. 1, the wireless communication system includes a mobile station 10 (MS) and a base station 20 (BS). The MS 10 may be stationary or mobile and may be referred to by other terms such as a user equipment (UE), a user terminal (UT), a subscriber station (SS), a wireless device or an advanced mobile station (AMS).

Further, in case the wireless communication system shown in FIG. 1 supports device cooperative communication (or transmission), the MS 10 includes the concept of a device cooperation requesting device requesting a device cooperation, a device cooperation accepting device accepting the device cooperation, and a cooperation participating device participating in the device cooperation.

Hereinafter, what is related to client cooperation is briefly described.

Client cooperation (CC) or cooperative communication (CC) refers to transmitting and receiving signals or data through a direct (link) communication between devices and cooperatively transmitting the transmitted/received signals or data to a base station or a device.

Here, devices may be classified, depending on their operation and roles, into non-cooperative terminals, cooperation-capable terminals, cooperation participating terminals, cooperative transmission terminals, and cooperation requesting terminals. The non-cooperative terminals may also be referred to as single transmission terminals. The cooperation-capable terminals may also be referred to as cooperative terminal candidates.

Here, the cooperation participating terminals refer to terminals that participate in client cooperation but do not send data to a base station.

Hereinafter, as used herein, an MS requesting client cooperation may be referred to as a first MS, and an MS accepting client cooperation request, i.e., an MS transmitting UL data of the first MS to the base station, may be referred to as a second MS.

As described above, the first MS may be also referred to a cooperation requesting MS, a source MS (S-MS) or a cooperation subject device, and the second MS may be also referred to a cooperation accepting MS, a cooperating MS (C-MS), a target MS (T-MS), or a cooperated MS. Here, the term "second MS" includes both the cooperative transmission MS and the cooperation participating MS.

In other words, the first MS means an MS that independently attends data transmission/reception with a base station and/or a relay station, and the second MS means an MS that assists in data transmission/reception with a base station and/or a relay station.

Further, a direct transmission between two MSs performing cooperative communication may use single RAT or multi RATs. At this time, in case an MS performing client cooperation supports the multi RAT, a RAT different from a RAT (radio access transmission) used for signal transmission with the base station may be used to perform signal transmission/reception between the two MSs. A detailed description thereof will be given below with reference to FIG. 5.

Further, the base station transmits information on client cooperation to the two MSs performing client cooperation (source MS and cooperative MS) through a DL signal (e.g., CC_Transmission_info). At this time, the DL signal may contain the following information for CC.

That is, CC_Transmission_info includes information described below in (1) to (6):

(1) Device pairing or grouping information for performing client cooperation, or an MS ID (STID or C-RNTI) of an MS performing CC operation in case grouping or pairing ID is not used (2) Resource allocation information for CC Here, the resource allocation information for CC includes UL resource info assigned by the base station for CC operation, the number of RBs or subbands, indexes of RBs or subbands, start points of symbols or carriers.

(3) Power control offset and initial transmission power (initial Tx power) information (4) Transmission information relating to MIMO, rank, and MCS (5) Time offset information indicating a start of CC operation (6) Information indicating a start of other RAT (other RAT start indicator)

For example, the information indicating a start of other RAT includes channel index information and an indicator for starting Wi-Fi operation.

Client cooperation (or cooperative communication) will be described below in more detail with reference to FIGS. 5 to 7.

The base station 20 is generally a fixed station communicating with the MS 10 and may be referred to by other terms such as a nodeB, a base transceiver system (BTS), or an access point. One or more cells may be included in one base station 20.

The wireless communication system may be an orthogonal frequency division multiplexing (OFDM)/orthogonal frequency division multiple access (OFDMA)-based system.

OFDM uses multiple orthogonal subcarriers. OFDM uses orthogonality between inverse fast Fourier Transform (IFFT) and fast Fourier transform (FFT). In a transmitter, data is subjected to IFFT and is transmitted. In a receiver, a received signal undergoes FFT so that the original data is restored. The transmitter uses IFFT to combine multiple subcarriers, and the receiver uses corresponding FFT to separate the multiple subcarriers.

Heterogeneous-Network Wireless Communication Environment

Figure 2:
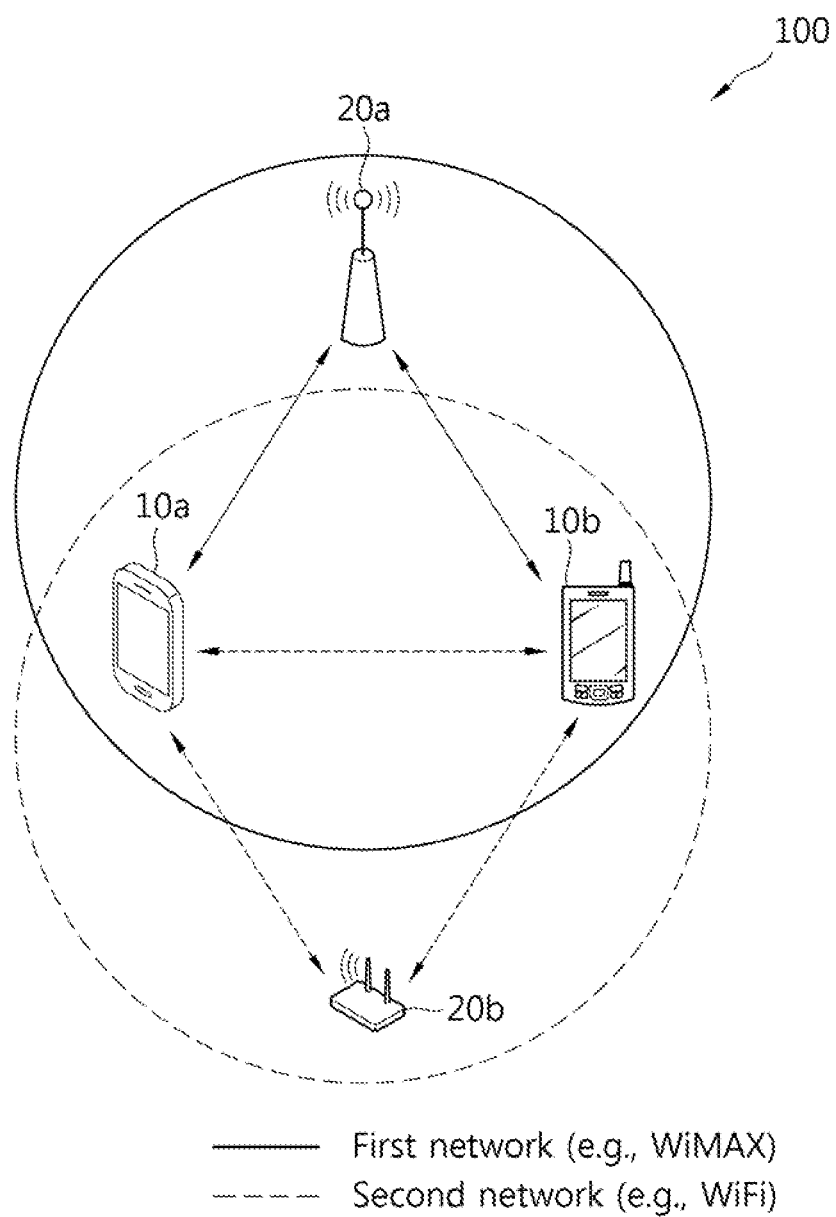
FIG. 2 shows an example of a system performing client cooperation (CC) in a wireless communication environment with two or more heterogeneous networks (multi-RAT) according to an embodiment of the present invention.

FIG. 2 shows an example of a system performing client cooperation (CC) in a wireless communication environment with two or more heterogeneous networks (multi-RAT) according to an embodiment of the present invention.

In a mobile communication system, a user equipment may receive information over a downlink from a base station, and the user equipment may transmit information over an uplink. Information transmitted/received from/to the user equipment includes data and various types of control information, and various physical channels are provided depending on the type and purpose of information transmitted/received from/to the user equipment.

In the current communication environment, two or more heterogeneous networks different from each other may be present. For example, various heterogeneous networks such as a WiMax network, which is an exemplary mobile communication system network, and a Wi-Fi network may be provided. The heterogeneous network refers to a network that adopts a communication scheme different from a communication scheme used in a specific network, and the heterogeneous device refers to a device that belongs to the heterogeneous network adopting the different communication scheme from that of the specific network.

For example, with respect to the WiMAX network and the device belonging to the WiMAX network, since the WiFi network uses a different communication scheme from that used in the WiMAX network, the WiFi network is a heterogeneous network, and the device belonging to the WiFi network is a heterogeneous device. With respect to the WiFi network, the WiMAX network would be a heterogeneous network, and the device belonging to the WiMAX network would be a heterogeneous device.

As used herein, the "multimode MS" refers to a device supporting use of two or more heterogeneous networks (or a plurality of RATs). The Wi-Fi refers to an local area network (LAN) that may provide high-speed Internet access within a predetermined range of a place where an access point (AP) is installed. The Wi-Fi uses a radio frequency (RF) or an infrared (IR) transmission scheme and is often referred to as wireless LAN.

In a wireless communication environment, a multimode MS may use a heterogeneous network provided to support a heterogeneous device in addition to the radio access technology (RAT) being serviced, in order to perform efficient signal transmission and reception or in order to enhance throughput. The RAT is a type of technology used for radio access. For example, the RAT includes GSM/EDGE radio access network (GERAN), UMTS terrestrial radio access network (UTRAN), evolved-UMTS terrestrial radio access network (E-UTRAN), WiMAX, LTE (-A), and Wi-Fi. In the same area, GERAN, UTRAN, E-UTRAN, WiMAX, and/or Wi-Fi may be mixed.

At this time, the multimode MS, which supports a plurality of RATs to enable use of two or more heterogeneous networks, is not restricted to a specific RAT and may transmit and receive signals using other RATs to be able to receive the best service in the current device situation. The number of heterogeneous networks (a plurality of RATs) accessed by the multimode MS to perform signal transmission and reception may be two or more. Accordingly, the multimode MS may conduct signal transmission and reception with or in cooperation with each of base stations using RATs different from the serving base station or base stations using a heterogeneous network (heterogeneous RAT).

Referring to FIG. 2, in the wireless communication system 100, an MS may transmit and receive signals using two or more heterogeneous networks (or a plurality of RATs).

In FIG. 2, as an example, an MS transmits and receives signals using a first network (e.g., WiMAX network) and a second network (e.g., Wi-Fi network). In the wireless communication system, a first MS 10a and a second MS 10b are multimode MSs that may use two or more heterogeneous networks, that is, may support multi-RATs.

In other words, as shown in FIG. 2, the first MS 10a and the second MS 10b support a multimode to be able to transmit and receive signals through the WiMAX network and the Wi-Fi network that are heterogeneous networks with respect to each other.

At this time, in the wireless communication system 100, there may be a base station (20a, BS) over the first network (WiMAX network). In the wireless communication system, the first MS 10a and the second MS 10b supporting the multi-RAT may transmit and receive signals through the first network (WiMAX network).

Further, in the wireless communication system, there may be an access point (20b, AP) corresponding to a base station in the second network (Wi-Fi network). In the wireless communication system, the first MS 10a and the second MS 10b supporting the multi-RAT may transmit and receive signals through the second network (Wi-Fi network).

That is, in the wireless communication system 100, the first MS 10a and the second MS 10b may perform communication through the access point 20b according to the configuration of the infrastructure mode or may directly communicate with each other according to the configuration of the Ad-hoc mode. Hereinafter, although no specific mention is made on the access point 20b, the first MS 10a and the second MS 10b are assumed to be able to transmit and receive signals therebetween through the second network (WiFi network).

As used herein, client cooperation (CC) performed between the first MS 10a and the second MS 10b is assumed to be performed for the second network (Wi-Fi network) corresponding to a direct link between MSs, which is different from the first network (WiMAX network) corresponding to a cellular network. As such, an example of the direct link between MSs is a Wi-Fi network in the present invention, but is not limited thereto.

Meanwhile, the first MS 10a and the second MS 10b are grouped or paired to transmit and receive signals through client cooperation (CC). The grouping or pairing of the first MS 10a and the second MS 10b may be done by a method of determining a counterpart MS to perform client cooperation and sending a request by one of the MSs or by a method of indicating information of MSs to perform client cooperation by the base station 20a.

FIG. 3 shows a concept of a cooperative cluster of mobile stations according to an embodiment of the present invention.

As shown in FIG. 3, cooperation-capable MSs may be bundled into a virtual group that is referred to as a cooperative cluster 10'. Here, the cooperative cluster 10' may be also referred to by terms such as client cooperation connection or MS pairing.

Specifically, as shown in FIG. 3(*a*), the cooperative cluster 10' may include all MSs that may perform client cooperation, or as shown in FIG. 3(*b*), the cooperative cluster 10' may include cooperation-capable MSs based on geometry information.

The cooperative cluster 10' may be generated by the base station when the MS enters the base station (so-called "network entry"), or may be generated by establishing a direct cooperative relationship between the MSs.

In case the base station generates the cooperative cluster 10', information on the cooperative cluster may be periodically broadcast by the base station. Or, in response to an MS' request, the information on cooperative cluster 10' may be unicast to each MS.

If the MSs, by themselves, form the cooperation cluster, the information on the cooperation cluster may be unicast or multicast by the MSs or any MS.

Meanwhile, FIG. 3 shows an example where the cooperation cluster is generated only for MSs belonging to a cell of a single base station in client cooperation.

Performing Mode of Client Cooperation Between MSs

Figure 4:
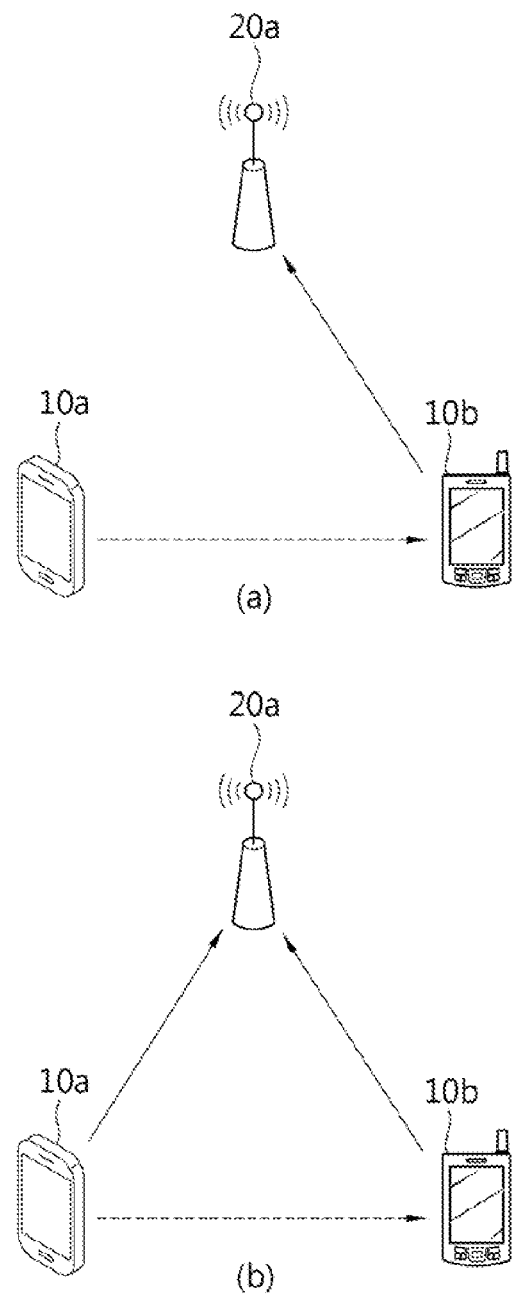
FIGS. 4(a) and (b) shows an example of client cooperation structure according to an embodiment of the present invention.

FIGS. 4(*a*) and (*b*) shows an example of client cooperation structure according to an embodiment of the present invention.

Referring to FIGS. 4(*a*) and (*b*), modes in which MSs supporting the multi-RAT perform client cooperation (CC) are described. Hereinafter, for ease of distinction, the term "mode" is used, but is not limited thereto.

In FIGS. 4(*a*) and (*b*), the first MS 10*a* and the second MS 10*b* have a relationship of performing client cooperation (CC). The first MS 10*a* operates as a source MS (S-MS) attempting to transmit data to the base station 20, and the second MS 10*b* operates as a cooperative MS (C-MS) assisting in data transmission and reception of the first MS 10*a* through client cooperation (CC).

Client cooperation (CC) of the MS supporting the multi-RAT may be applicable to when a large propagation loss occurs in the RAT between the source MS and the base station or when the channel status is not good, and other cases such as when the state of the source MS needs it (e.g., short of remaining battery) irrespective of the channel stat or when a user of the source MS requests quick/emergent transmission.

As such, the multi-RAT supportive MS may operate in a relaying mode or in a cooperative communication mode to perform data transmission and reception through client cooperation.

FIG. 4(*a*) shows an example where a multi-RAT supportive MS performs client cooperation (CC) in accordance with the relaying mode. In the relaying mode, the source MS (S-MS) attempting to transmit data to the base station transmits data to the cooperative MS (C-MS), and the cooperative MS (C-MS) transmits the data received from the source MS (S-MS) to the base station.

Further detailed description is given with reference to FIG. 4(*a*). The source MS 10*a* that supports multi-RAT transmits data to the cooperative MS 10*b* through a RAT corresponding to a direct link, i.e., second network, and the cooperative MS 10*b* transfers the received data to the base station 20 through an RAT, i.e., first network, which is different from the RAT corresponding to the direct link. As such, the cooperative MS 10*b* needs to be assigned with an uplink resource (UL resource) for data transmission. At this time, the uplink resource may be assigned by the base station 20 in response to a request from the source MS 10*a* or the cooperative MS 10*b*.

FIG. 4(*b*) shows an example where a multi-RAT supportive MS performs client cooperation (CC) in accordance with the cooperative communication mode. In the cooperative communication mode, the source MS (S-MS) attempting to send data to the base station transmits data to the cooperative MS (C-MS), and the source MS (S-MS) and the cooperative MS (C-MS) cooperate to transmit data to the base station.

Further detailed description is made with reference to FIG. 4(*b*). The source MS 10*a* supporting multi-RAT transmits data to the cooperative MS 10*b* through a RAT corresponding to a direct link, i.e., second network, and the source MS 10*a* and the cooperative MS 10*b* perform cooperative communication through the first network that is a RAT different from the RAT corresponding to the direct link, thereby transferring the received data to the base station 20.

Hereinafter, in the process of client cooperation (mobile relaying or client cooperation (CC)) suggested herein, a method for measuring a channel status (or link status) between a source MS (first MS) and a cooperative MS (second MS) is described in detail.

Figure 5:
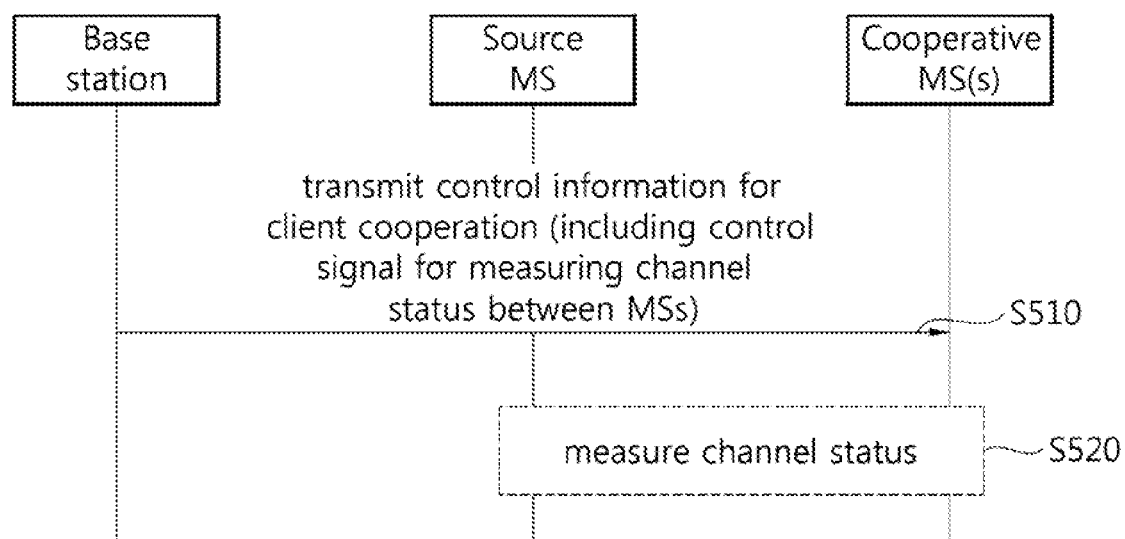
FIG. 5 is a flowchart showing an example of measuring a channel status between a source MS and a cooperative MS according to an embodiment of the present invention.

FIG. 5 is a flowchart showing an example of measuring a channel status between a source MS and a cooperative MS according to an embodiment of the present invention.

First, a number of MSs are present in a cell, and these MSs may send a request for client cooperation (cooperative communication or mobile relaying) to a base station for purposes of low power consumption, enhancement of throughput, or reliability. Or, the base station may send a request for client cooperation to the MSs.

Although not shown in FIG. 5, the source MS sends a request for client cooperation (e.g., relaying or cooperation) to the base station. Here, the source MS may request client cooperation by transmitting a device cooperation request message (DC_REQ-message) to the base station.

The DC_REQ-message may include information on a type of client cooperation.

Here, the type of client cooperation may be mobile relaying, cooperative communication, group header, or -device direct communication between MSs.

In case only mobile relaying and cooperative communication are considered as the type of client cooperation, the cooperation type indicator of the client cooperation included in the DC_REQ-message may be constituted of one bit. As an example, in case the cooperation type indicator is 0, the type of client cooperation indicates client cooperation through mobile relaying, and in case the cooperation type indicator is 1, the type of client cooperation indicates client cooperation through cooperative communication.

The above indication for the client cooperation operation mode may be set and applied in an opposite manner to what is described above.

The base station receives the request for client cooperation from the source MS and selects one or more cooperative MSs that are to perform client cooperation.

Thereafter, the base station indicates the selected cooperative MS(s) to the source MS and/or MSs to perform client cooperation (the selected cooperative MS). In such case, the base station may also provide information necessary for detecting a specific signal of the source MS (e.g., a resource allocation, STID/FID, a pilot pattern, reference sequence inform, a time offset, a range sequence index, a shift value, a length, a power, an STID (or pairing ID or group ID)) (S510).

Further, the base station may need information for a channel environment, i.e., transmission environment between two MSs for efficiently performing client cooperation between the source MS and the cooperative MS. Accordingly, the base station may also transmit, to the source MS and/or the cooperative MS, information necessary for measuring the channel status (or link status) between two MSs, i.e., a resource allocation, STID/FID, a pilot pattern, reference sequence inform, a time offset, a range sequence idx, a shift value, a length, a power, a STID (or pairing ID or group ID) (S510).

Then, the source MS and the cooperative MS receive information corresponding to step S510 necessary for performing client cooperation and measure a channel status (or link status) between the source MS and the cooperative MS by using the allocated resource or allocated sequence (S520).

Here, a method of measuring the channel status between the two MSs will be described below in detail with reference to the drawings.

Further, the channel status information between the cooperative MS and the source MS, which has been measured by the cooperative MS, may be transmitted to the base station and/or the source MS.

1. Channel Status Measurement Between MSs Using Ranging Sequence

Figure 6:
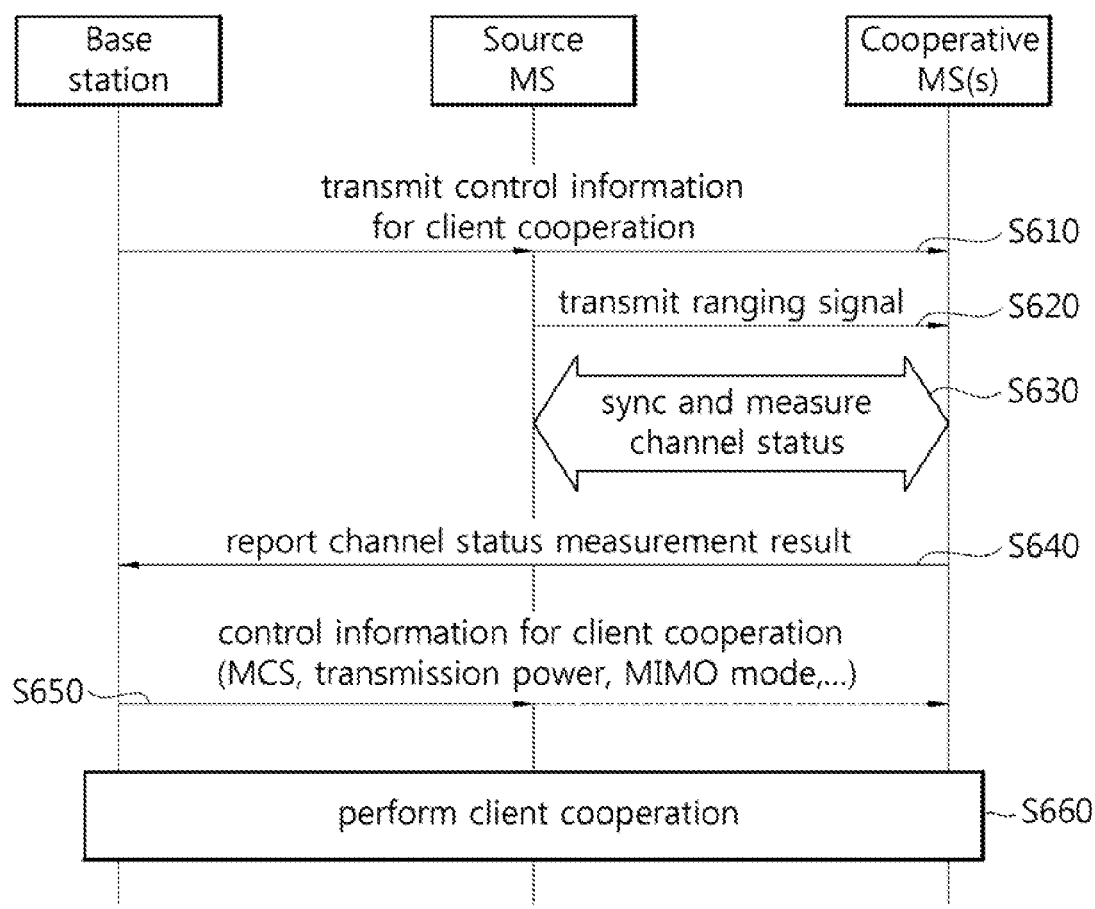
FIG. 6 is a flowchart showing a method of measuring a channel status between a source MS and a cooperative MS using a ranging sequence according to an embodiment of the present invention.

FIG. 6 is a flowchart showing a method of measuring a channel status between a source MS and a cooperative MS using a ranging sequence according to an embodiment of the present invention.

Step S610 is the same as step S510 in FIG. 5, and detailed description thereof is skipped.

First, in case MS are connected with the base station and transmit data to the base station through client cooperation with other MSs, the source MS and the cooperative MS that perform client cooperation should be synchronized with each other.

Here, for sync between the source MS and the cooperative MS, the source MS transmits, to the cooperative MS or candidate MSs of the cooperative MS, a ranging signal (user specific code for device communication or dedicated code) on a UL resources (dedicated resource for user or device cooperation, dedicated ranging zone for device cooperation) assigned for ranging among information received in step S610 (S620).

The ranging signal may be transmitted to the cooperative MS or the candidate MSs of the cooperative MS in a dedicated or common manner. Accordingly, in case MSs use an LTE system, information on the signal is transmitted to each MS through a PDCCH or may be transmitted to each MS using a common search space (CSS) of the PDCCH or a PBCH.

Thereafter, the cooperative MS receives the ranging signal from the source MS and syncs itself with the source MS in light of time/frequency using the received ranging signal and measures a link or channel status with the source MS (S630).

After measuring the channel status with the source MS, the cooperative MS transmits information (SNR or SINR, channel status, timing related information) related to the channel status measurement result to the base station (S640).

Thereafter, the base station receives the information relating to the channel status measurement result between the two MSs from the cooperative MS and transmits, to the source MS, a control signal for client cooperation, for example, MCS, transmit power, MIMO mode, etc. by using the received information (S650). The control signal may be individually transmitted to the two MSs through the PDCCH or may be simultaneously transmitted to the two MSs paired through CSS.

Then, the source MS performs client cooperation with the cooperative MS using the resource assigned from the base station.

Here, the ranging sequence transmitted from the source MS to the cooperative MS may be allocated as a dedicated sequence from the base station to the source MS for purposes of client cooperation, or may be arbitrarily selected by the source MS from a ranging sequence set configured for client cooperation and may be used for cooperative communication.

Further, the MS may use a sequence defined to access to the base station instead of defining a new ranging signal in order to measure a channel status between two MSs as described above. In such case, when the channel status between two MSs is measured, dedicated cyclic shift value/hopping pattern/spread sequence may be allocated to the source MS to measure the channel status between two Mss.

Further, the base station may transmit a ranging indicator to the source MS and the cooperative MS at a predetermined period to periodically obtain sync between the two Mss and to measure the channel status, thereby transmitting the ranging sequence.

At this time, the initial ranging signal for establishing a link between the two MSs may be designed considering non-synchronized ranging, and a periodical ranging signal, after obtaining the initial sync between the two MSs, may be efficiently designed, e.g., in such a manner as to reduce the number of symbols in the ranging signal under the assumption that, basically, sync has been already done.

As an example, the whole resource section occupied by the initial ranging signal may be divided into several opportunities (in light of time and/or frequency) and may be used for periodic transmission of the ranging signal to measure links between several MSs.

FIG. 7 is a flowchart showing a method of measuring a channel status between a source MS and a cooperative MS using a ranging sequence according to another embodiment of the present invention.

Steps S710 to S730 are the same as step S610 to S630 in FIG. 6 and detailed description thereof is not repeated.

In step S730, the cooperative MS measures a channel status or link status with the source MS and transmits information relating to a result of the channel status measurement to the source MS (S740).

Thereafter, the source MS transmits the channel status measurement result information received from the cooperative MS to the base station (S750).

Then, the base station receives the channel status measurement result between the source MS and the cooperative MS from the source MS and then transmits the control information for client cooperation to the source MS and the cooperative MS (S760).

Here, the control information transmitted in step S760 is the same as the control information transmitted in step S650.

Thereafter, the source MS and the cooperative MS perform cooperative communication, i.e., client cooperation, based on the control information received from the base station (770).

Here, information for the cooperative MS to transmit information to the source MS in step S740 may be transmitted when the two MSs are paired or grouped for purposes of client cooperation or when the base station transmits information on the ranging to the two MSs.

Or, the resource allocated for ranging may be reused for the cooperative MS to transmit signals to the source MS or for signal transmission between the two MSs, the base station may allocate and use a dedicated or common channel.

FIG. 8 is a flowchart showing a method of measuring a channel status between a source MS and a cooperative MS using a ranging sequence according to another embodiment of the present invention.

First, in case client cooperation is performed in response to a request from the base station or a request from the source MS, the base station transmits, to the source MS and cooperative MS or a cooperative MS group, control information for establishing sync between the source MS and the cooperative MS and obtaining channel status information (e.g., dedicated ranging code, dedicated resource allocation, ranging zone) (S810). Here, the control information may be transmitted through a device cooperative ranging configuring message (DC_RNG_CFG message).

At this time, the base station transmits information on the ranging code transmitted from the source MS to the cooperative MS (dedicated ranging code index, length, spread sequence, hopping pattern, etc.) to the source MS and the cooperative MSs, so that the source MS may transmit the ranging signal allocated from the base station to the cooperative MS.

Here, the ranging code used by the source MS may be the one obtained by modifying a code used for initial ranging. The ranging information may be transmitted to the source MS and the cooperative MS from the base station in a unicast or multicast scheme. As an example, in the LTE system, the information may be transmitted through the PBCH or PDCCH.

The source MS transmits the ranging code indicated from the base station to the cooperative MS using an allocated resource or dedicated ranging zone (S820). Thereafter, the cooperative MS receives the ranging code transmitted from the source MS and obtains sync information and signal power using the received ranging code and measures the link state or channel status with the source MS.

Then, the cooperative MSs transmit, to the base station, the result of measuring the channel status with the source MS and information on whether to receive a ranging signal (ACK or NACK) using the UL resource or feedback channel allocated from the base station (S830).

At this time, the signal transmitted from the cooperative MS to the base station includes a ranging ACK for receiving the ranging sequence from the source MS.

Thereafter, the base station receives the link information and ranging ACK from the cooperative MSs and selects a cooperative MS having the best link with the source MS and determines a parameter for client cooperation using the received channel status information (S840).

Referring to FIG. 8, it can be seen that the base station selects cooperative MS 1 as the cooperative MS for client cooperation with the source MS.

Thereafter, the base station allocates a bandwidth for UL transmission to the source MS and the selected cooperative MS, i.e., cooperative MS 1, and transmits information thereon to the source MS and cooperative MS 1 through DC_CDMA_alloc_IE (S850).

Or, the base station transmits information to the source MS through DC_CDMA_alloc_IE and may transmit the information to the cooperative MS using a unicast signal, DC_indication message.

Then, the source MS transmits a device cooperative ranging request message (DC_RNG_REQ-message) to the cooperative MS using a resource zone or resource allocated from the base station (S860). The cooperative MS may grasp the channel information for the allocated resource and information on interference through the signal.

Subsequently, the cooperative MS transfers the information of the signal received from the source MS to the base station in the form of the received signal or including the information and channel status measurement information using the device cooperative ranging request message (DC_RNG_REQ-message) or using the device cooperative request message (DC_REQ-message) (S870).

Here, the source MS may send a request for transmission parameters necessary for client cooperation using the allocated resource to the base station using the RNG_REQ message.

Here, the source MS may also send a request for transmission parameters necessary for client cooperation to the base station using the RNG_REQ message.

Thereafter, the base station transmits start time, duration, and transmit parameter for performing client cooperation to the source MS and the cooperative MS using a device cooperative ranging response message (DC_RNG_RSP-message) (S880).

Then, the cooperative MS and the source MS perform client cooperation using the DC_RNG_RSP-message received from the base station.

Here, in case a cooperative MS to perform client cooperation with the source MS has been already determined by the base station, the procedure of selecting the cooperative MS may be omitted from step S840.

Further, in case the cooperative MS and resource and transmission parameters for performing client cooperation have been determined in step S840, steps S860 to S880 may be omitted so that client cooperation may be performed without transmission and reception of an additional request signal.

Further, the ranging channel may be configured in the form of several subbands or RBs in the frequency domain so as to achieve sync between the two MSs and to grasp channel status information using the ranging sequence as described above.

Accordingly, one subband (4RB) allocated for ranging during the greenfield operation may be repeated at a predetermined interval in the frequency domain or the ranging codes allocated to several subbands may be transmitted.

Or, a few RBs may be distributed within the same time or frequency and the ranging sequence may be transmitted.

2. Channel Status Measurement Between MSs Using a Dedicated UL Sounding Signal

Figure 9A:
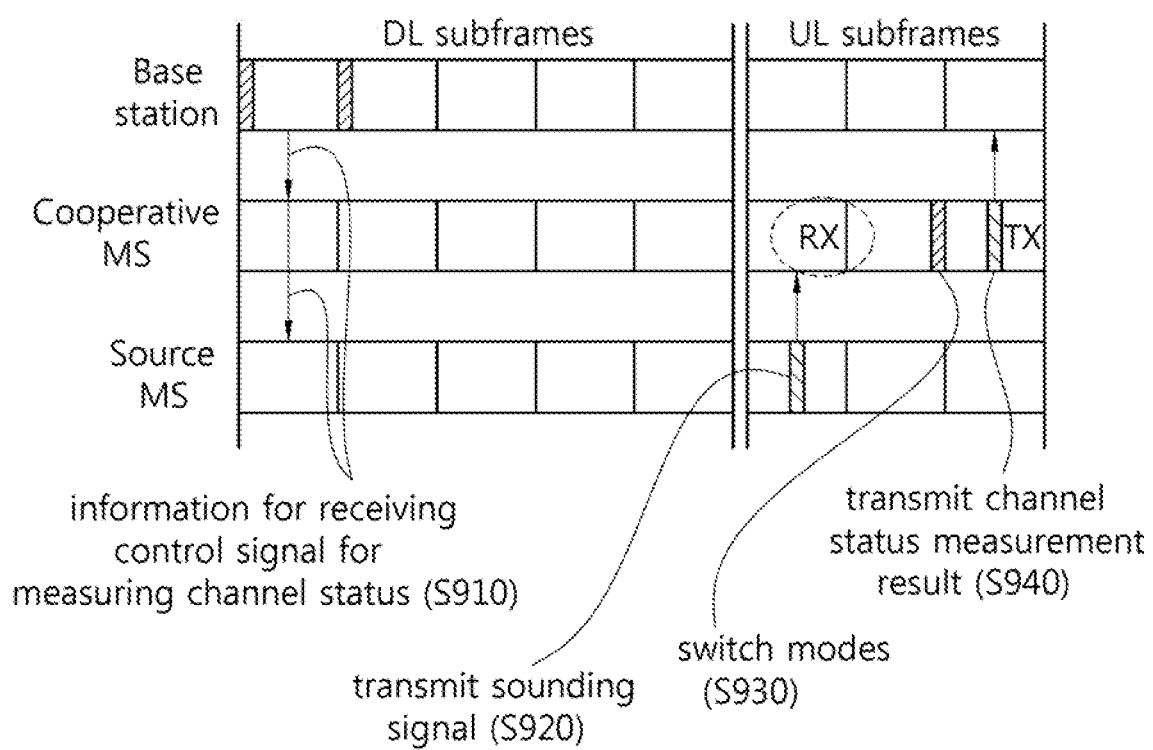
FIGS. 9(a) and (b) show a method for measuring a channel status between MSs using a dedicated UL sounding signal and a frame structure according to another embodiment of the present invention.

FIGS. 9(a) and (b) show a method for measuring a channel status between MSs using a dedicated UL sounding signal and a frame structure according to another embodiment of the present invention.

Referring to FIG. 9a, to obtain information on the channel status or link status between the source MS and the cooperative MS, the base station allocates dedicated sounding zones and/or dedicated sounding sequences to the source MS and the cooperative MS (or candidate MSs of the cooperative MS) (S910). Here, the sounding signal transmitted for measuring the channel status between two MSs may be transmitted through all, some, or one of the symbols in the subframe, mini-band, or RB. In particular, to efficiently use the resource, the sounding signal transmitted from the source MS may be preferably positioned at the first or last symbol of the subframe (refer to FIG. 9b).

At this time, in addition to the information on the region and sequence allocated for transmission of the sounding signal to the source MS and the cooperative MS for purposes of client cooperation, the base station may transmit shift value, length, power, STID, or paired ID or group ID or virtual ID. Here, the above information additionally transmitted may be transmitted to the source MS using the DC_REP-REQ_message (device cooperation report request message) transmitted from the base station to the source MS.

The source MS receives the sounding signal for UL link measurement between the two MSs from the base station and transmits the sounding signal to the cooperative MS using the resource region or resource allocated from the base station (S920).

To receive the sounding signal transmitted from the source MS to the cooperative MS, the cooperative MS receives the sounding signal transmitted from the source MS by modifying or switching the transmission mode (or reception mode) in the subframe over which the source MS transmits the sounding signal in the UL frame (S930).

The cooperative MS receives the sounding signal transmitted from the source MS and transmits, to the base station and/or the source MS, information on the link with the source MS, such as channel status with the source MS, CQI, SINR, and interference level, as grasped through the sounding signal (S940).

Further, in the foregoing, the cooperative MS needs a transition gap 920 for TX/RX switching to receive the sounding signal transmitted from the source MS in the UL frame. The transition gap may be configured of one or more symbols or subframes.

Here, it is effective for the transition gap 920 not to be allocated to the subframe where the sounding signal (for the base station) of the cooperative MS itself.

As an example, in case a subframe consists of seven or more symbols as does in the IEEE 802.16m, a sounding signal and a transition gap may be positioned in one subframe. For example, since in the 802.16m system a type-2 subframe consists of seven symbols, in case it includes both a sounding signal and a transition gap, the last symbol of the subframe is assigned to the transition gap while the sounding signal is transmitted over the symbol right before the symbol where the transition gap is positioned.

At this time, the type-2 subframe operates as a subframe consisting of five symbols. Here, information on the frame structure for client cooperation of the cooperative MS may be transmitted to the MS performing client cooperation through the device cooperative configuration commanding message (DC_config_CMD message).

In other words, as described above, in case the channel status between the two MSs are measured using the UL sounding signal, the base station transmits the control information for client cooperation to the cooperative MS and the source MS using the DL control signal as does in step S910 of FIG. 9a.

At this time, the control information transmitted from the base station to the source MS and the cooperative MS may be transmitted through each dedicated control information in the same subframe or may be transmitted through the common control information in the same subframe.

Or, the base station may transmit control information for client cooperation to each of the cooperative MS and the source MS using different subframes each other.

Figure 9B:
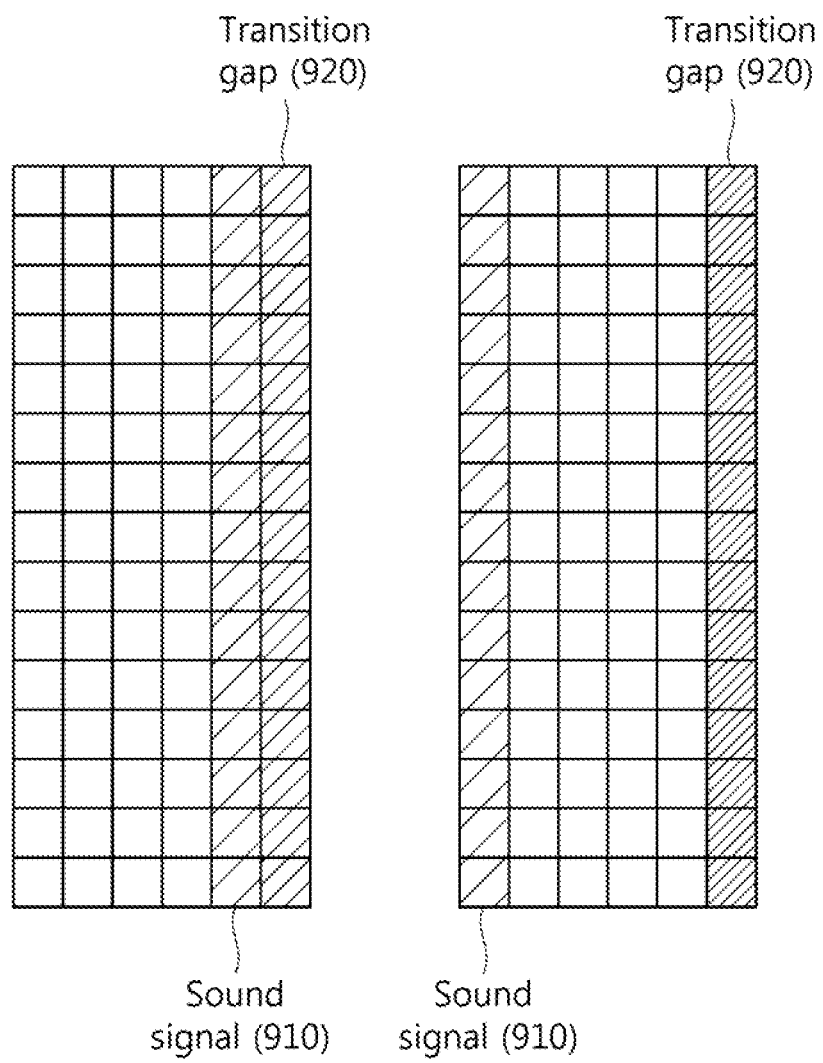

Here, as shown in FIG. 9b, the sounding signal may be placed at the first or last symbol of the subframe (910), and the transition gap is positioned at the last symbol of the last subframe in the reception (Rx) region.

If the sounding signal and the transition gap are present in the same subframe, the sounding signal and the transition gap may be placed at the first symbol and the last symbol, respectively, or the transition gap may be placed at the last part of the subframe while the sounding signal may be positioned right before the transition gap.

As shown in FIG. 9a, when the source MS transmits the sounding signal to the cooperative MS, the existing data part of the subframe where the sounding signal is transmitted, that is, the symbol where the sounding signal is transmitted may be subjected to punching or rate matching when the sounding signal is transmitted.

Accordingly, the subframe where the sounding signal is transmitted is a subframe having a form of excluding one symbol allocated for the sounding signal.

For example, the UL type-1 subframe (consisting of six symbols) transmits a signal using the form of a type-3 subframe where one symbol has been excluded. Here, the cooperative MS obtains channel information by receiving the sounding signal transmitted from the source MS and then transmits a channel status measurement result to the base station. Accordingly, as shown in FIG. 9a, a transition gap for RX and TX is included in the UL frame, and the subframe including the transition gap also allocates one symbol for the transition gap. Thus, it ends up having the form of a subframe where one symbol has been removed. At this time, it is preferable that the transition gap is not placed in the same subframe as the sounding signal for purposes of efficient data transmission.

As described above in connection with FIGS. 6 to 9, the dedicated resource for ranging signal transmission or for sounding signal transmission for measuring a channel status between two MSs may be set cell-specifically. That is, a dedicated region is formed for each cell, and the region may be designed to be commonly used for all the links between MSs in all cells.

Or, the region may be designed to be separated into several regions in light of time, frequency, or code so that the region may be used for several links between MSs in the cell.

Although the structure for the sounding signal transmitted to grasp the channel status between MSs has been described above based on the subframe, the subframe may be replaced with a slot (constituted of seven symbols) or subframe (2 slot) in the LTE system. In other words, the basic structure of the present invention is not limited to the subframe.

Figure 10A:
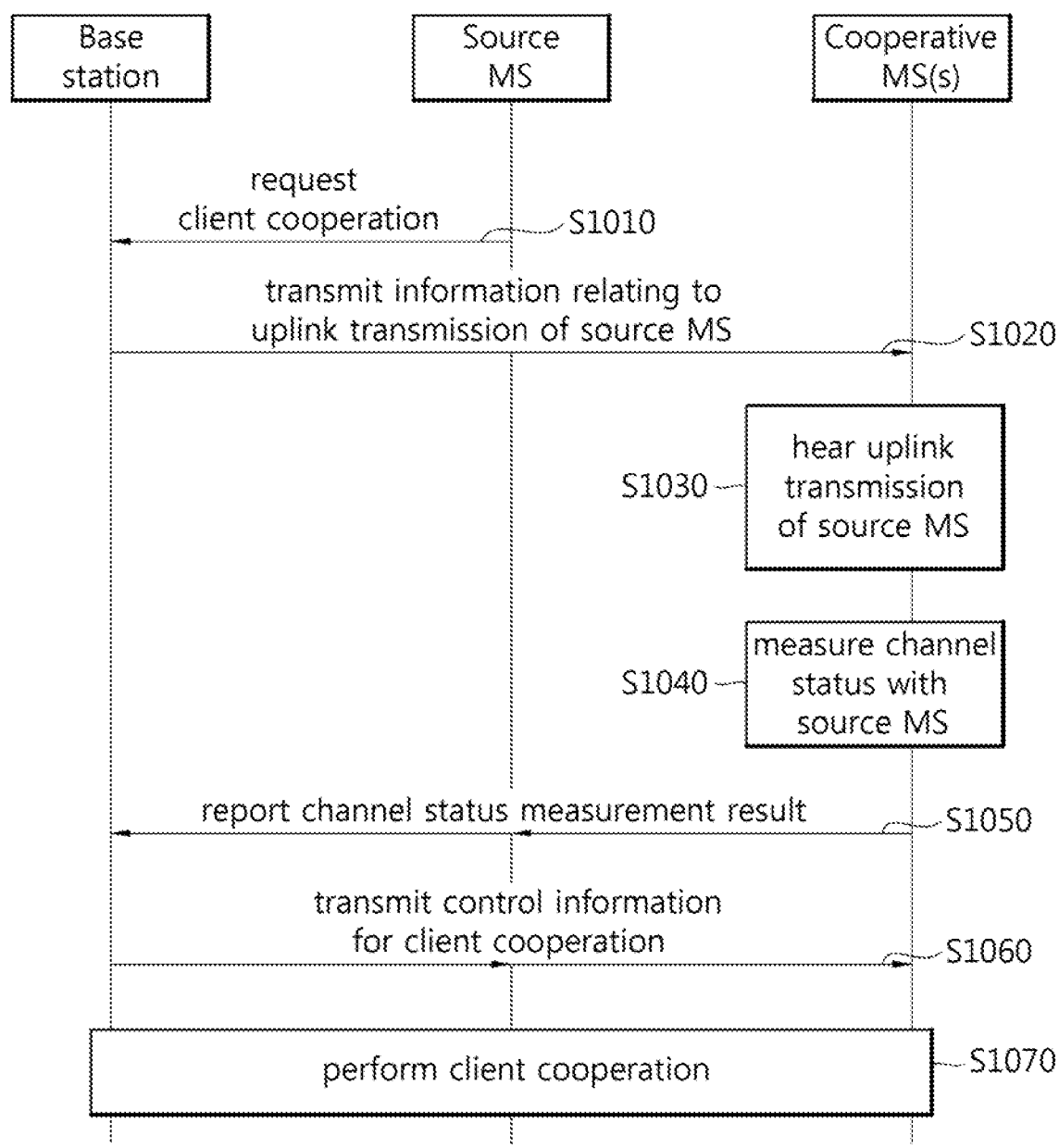
FIGS. 10(a) and (b) show a method for measuring a channel status between MSs and a frame structure according to another embodiment of the present invention.

FIGS. 10(a) and (b) show a method for measuring a channel status between MSs and a frame structure according to another embodiment of the present invention.

Figure 10B:
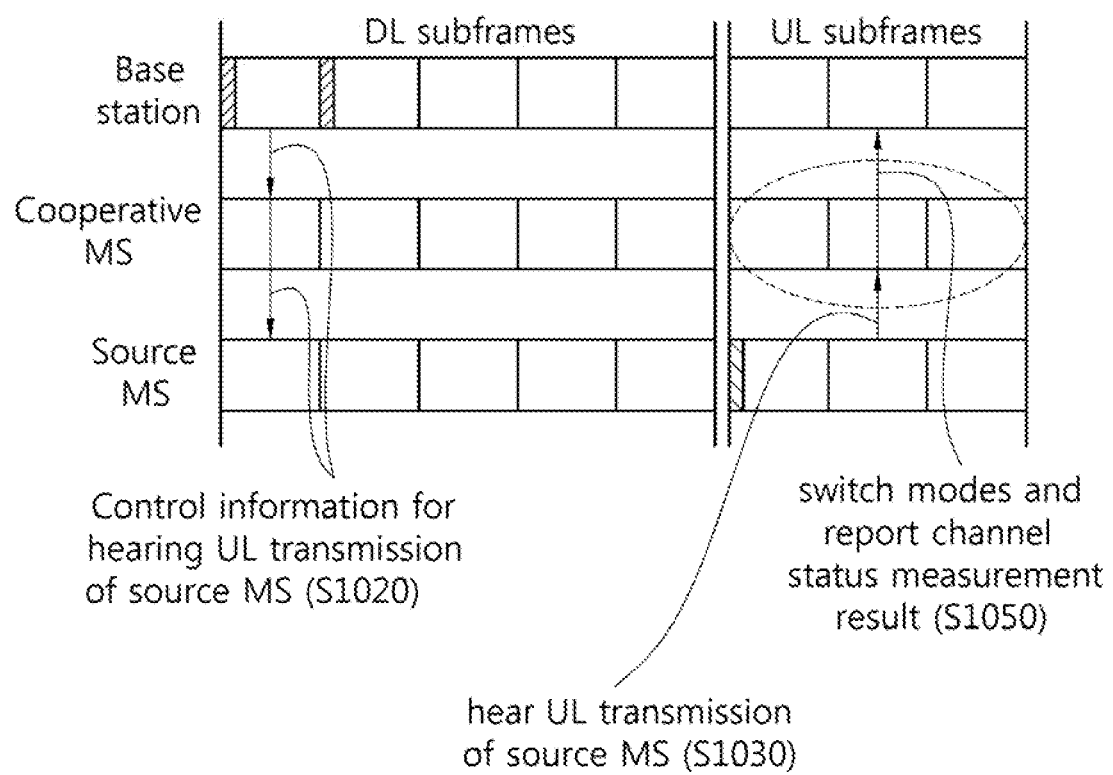

That is, FIGS. 10a and 10b show a method of measuring a link state or channel status between a source MS and a cooperative MS by the cooperative MS receiving a UL signal transmitted from the source MS to a base station unlike transmitting, by the source MS, a signal for channel measurement (ranging signal or sounding signal) to the cooperative MS using a resource allocated from the base station in order to perform measurement for client cooperation between MSs as shown in FIGS. 5 to 9.

Referring to FIG. 10a, in case the source MS sends a request for client cooperation to the base station (S1010), the base station transmits, to the cooperative MS or candidate MSs of the cooperative MS, information on a UL transmission of the source MS, i.e., transmission offset (Tad), Tx/Rx switching indicator, UL resource allocation, STID or virtual ID, MIMO mode information, UL sounding signal, pilot, MCS, and transmission power, using a unicast control signal or multi-cast control signal (S1020).

At this time, the information for receiving the UL transmission signal of the source MS may be transmitted to the cooperative MS through a device cooperative report request message (DC-REP_REQ message).

Or, decoding information may be transmitted to the cooperative MS so that the cooperative MS may decode the UL MAP and PDCCH transmitted from the base station to the source MS through the DL control or may be transmitted to a common space so that the cooperative MSs may be aware of it. Or, the base station may form a common map, pairing or grouping MAP for the cooperative MS to hear or monitor a UL transmission signal of the source MS and may transmit it to the source MS and the cooperative MS so that the cooperative MS, together with the source MS, may be provided with information for the UL transmission of the source MS through the DL region.

At this time, the cooperative MS may obtain information on transmission of the UL signal by the source MS by receiving the signal transmitted through the DL control.

Thereafter, the cooperative MS receives the UL transmission information of the source MS from the base station and performs mode switching or mode shift from Tx mode to Rx mode in the UL frame so as to receive the UL transmission signal of the source MS.

Accordingly, the cooperative MS operates in a receiving mode in the UL frame so that the source MS hears or monitors the UL signal transmitted from the source MS to the base station (S1030). In the foregoing, the cooperative MS does not receive all UL signals transmitted from the source MS to the base station and performs mode switching only on the subframe where the sounding signal (or ranging signal) is transmitted, thereby hearing or monitoring the sounding signal.

In such case, transition gaps are set before and behind the symbol where the sounding signal of the source MS is transmitted in the UL frame of the cooperative MS so as to hear or monitor the sounding signal. At this time, the set transition gap may be assigned one subframe to maintain frame alignment or one symbol.

To minimize the resources that are consumed for the transition gap, for example, if the sounding symbol is transmitted at the last part of the UL resource region, the cooperative MS which receives the sounding signal of the source MS need not transit it over UL, and this reduces waste caused by an additional transition gap.

The cooperative MS receives the UL signal transmitted from the source MS to the base station and measures the link status between the source MS and the cooperative MS using the received UL signal (S1040).

Thereafter, the cooperative MS transmits information on the measured link status to the base station and/or source MS (S1050). At this time, the cooperative MS may transmit the information on the link through a DC_REP_RSP message. Using the information on the link between the MSs transmitted from the cooperative MS, the base station transmits, to the source MS and/or cooperative MS, resource allocation, MCS, MIMO mode, transmission power and related control signals for client cooperation between the source MS and the cooperative MS (S1060).

Thereafter, the source MS and the cooperative MS perform client cooperation based on the control signals (S1070).

As described above, besides the method of obtaining sync between the source MS and the cooperative MS using the ranging signal, the base station may also achieve sync between the two MSs by transmitting, to the cooperative MS, a signal transmission offset value or Tad for the source MS.

Considering client cooperation using MSs, since a source MS and a cooperative MS performing client cooperation are typically positioned close to each other, a difference in Tad value for UL transmission between each MS and a base station is not large. Further, in case each MS has low or no mobility, the Tad value of each MS for UL transmission with the base station may not be subjected to a large change.

Accordingly, in achieving sync between the two MSs for client cooperation, the sync with the source MS may be maintained by transmitting the Tad value of the source MS from the base station to the cooperative MS without performing transmission and reception between the two MSs to make the two MSs synced with each other.

Here, the Tad value of the source MS transmitted from the base station may be transmitted using a request message for the MS to perform client cooperation or using a REP_RSP message for the request for client cooperation from the base station.

Or, the base station may be aware of the Tad values from the two MSs, and thus, considering this, may transmit, to the cooperative MS, an offset value between the two Tad values or an offset value to be considered when the cooperative MS actually receives a signal from the source MS.

As another example, considering, e.g., power consumption in performing client cooperation between MSs, when MSs that stay in the idle mode perform client cooperation with other MSs, power consumption of the MSs may be reduced and life time of the MSs may be prolonged.

Accordingly, for the MSs left in the idle mode to conduct client cooperation, the base station may transmit information on the client cooperation (e.g., client cooperation request or resource allocation information) to the idle mode MSs using a paging signal (or paging message).

The paging signal may be transmitted whenever a request for client cooperation is received, or on the contrary, may be transmitted including all the events that occur at given periodic timings.

The MSs that are left in the idle mode receive information on the source MS or information on client cooperation transmitted from the base station through the paging signal, measure the channel status or link status with the source MS using the method as shown in FIGS. 5 to 10, and transmits a result of the measured channel status to the base station.

Here, the base station selects a cooperative MS optimal to the source MS using the transmitted link quality (or channel status measurement result) and then transmits it to the source MS and the MSs that are left in the idle mode.

The idle mode MSs receive the confirm message for client cooperation from the base station, swift themselves into an active mode (that is, through a network reentry process), and then perform client cooperation.

Here, as the MS to perform client cooperation as selected by the base station, i.e., cooperative MS, an MS that has the best channel status or link quality with respect to the source MS is selected from a list of MSs to perform client cooperation possessed by the base station by a channel status measurement method as shown in FIGS. 5 to 10 in response to a request from the base station.

That is, the base station selects the cooperative MS by using the link measurement with the source MS that is measured for the channel status with the source MS and transmitted to the base station by each cooperative MS.

In other words, the process of selecting and confirming the cooperative MS by the base station may be added after the channel measurement process described above in connection with FIGS. 5 to 10.

Further, even when the base station sends a request for client cooperation (mobile relaying or cooperation) to the devices, the above-described processes may be performed for client cooperation between MSs.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 11.

Figure 11:
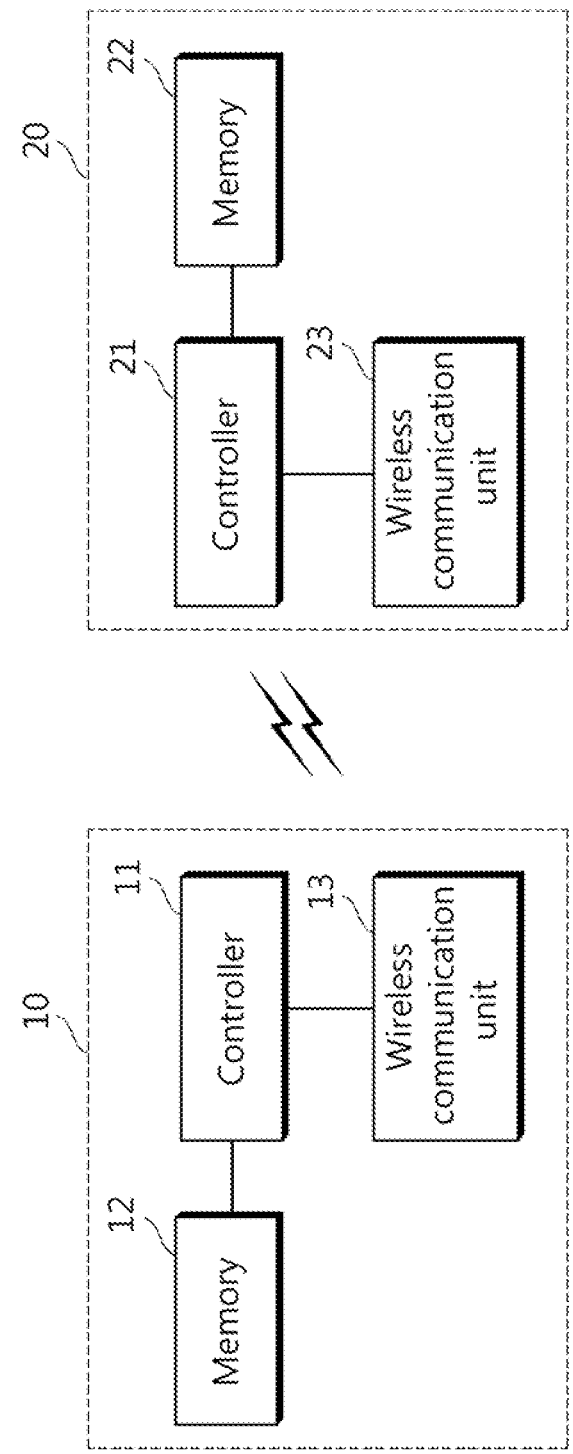
FIG. 11 is a block diagram showing internal structures of an MS and a BS in a wireless access system according to an embodiment of the present invention.

FIG. 11 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method for measuring a channel status between a first user equipment (UE) and a second UE in a wireless communication system communicating by using a radio frame including a plurality of downlink subframes and a plurality of uplink subframes, which follow the plurality of downlink subframes, the method comprising:
   receiving, by the second UE, control information related to a dedicated sounding zone from a base station through at least one of the plurality of downlink subframes,
   wherein the dedicated sounding zone is radio resource allocated for receiving a sounding signal;
   receiving, by the second UE, the sounding signal from the first UE,
   wherein the sounding signal is included in an initial symbol of an initial subframe of the plurality of uplink subframes, and
   wherein the initial symbol is included in the dedicated sounding zone;
   measuring, by the second UE, the channel status between the first UE and the second UE by using the sounding signal; and
   reporting, by the second UE, a result of measurement for the channel status to the base station,
   wherein a transition gap is included in a last symbol of the initial subframe of the plurality of uplink subframes.

2. The method of claim 1, wherein the control information further includes information related to a dedicated sounding sequence for the sounding signal.

3. The method of claim 2, wherein the at least one of the plurality of downlink subframes and the plurality of uplink subframes include six or seven OFDM symbols.

4. A cooperative user equipment (UE) for measuring channel status between a source UE and the cooperative UE in a wireless communication system communicating by using a radio frame including a plurality of downlink subframes and a plurality of uplink subframes which follow the plurality of downlink subframes, the cooperative UE comprising:
   a radio communication unit for transmitting and receiving a radio signal; and
   a controller connected to the radio communication unit and configured to:
      receive control information related to a dedicated sounding zone from a base station through at least one of the plurality of downlink subframe,
      wherein the dedicated sounding zone is radio resource allocated for receiving a sounding signal,
      receive the sounding signal from the source UE,
      wherein the sounding signal is included in an initial symbol of an initial subframe of the plurality of uplink subframes, and
      wherein the initial symbol is included in the dedicated sounding zone,
      measure the channel status between the source UE and the cooperative UE by using the sounding signal, and
      report a result of measurement for the channel status to the base station,
      wherein a transition gap is included in a last symbol of the initial subframe of the plurality of uplink subframes.

* * * * *